June 16, 1953 — A. E. FRANDI — 2,642,316
AUTOMOBILE WHEEL MOUNTING
Filed Oct. 12, 1949
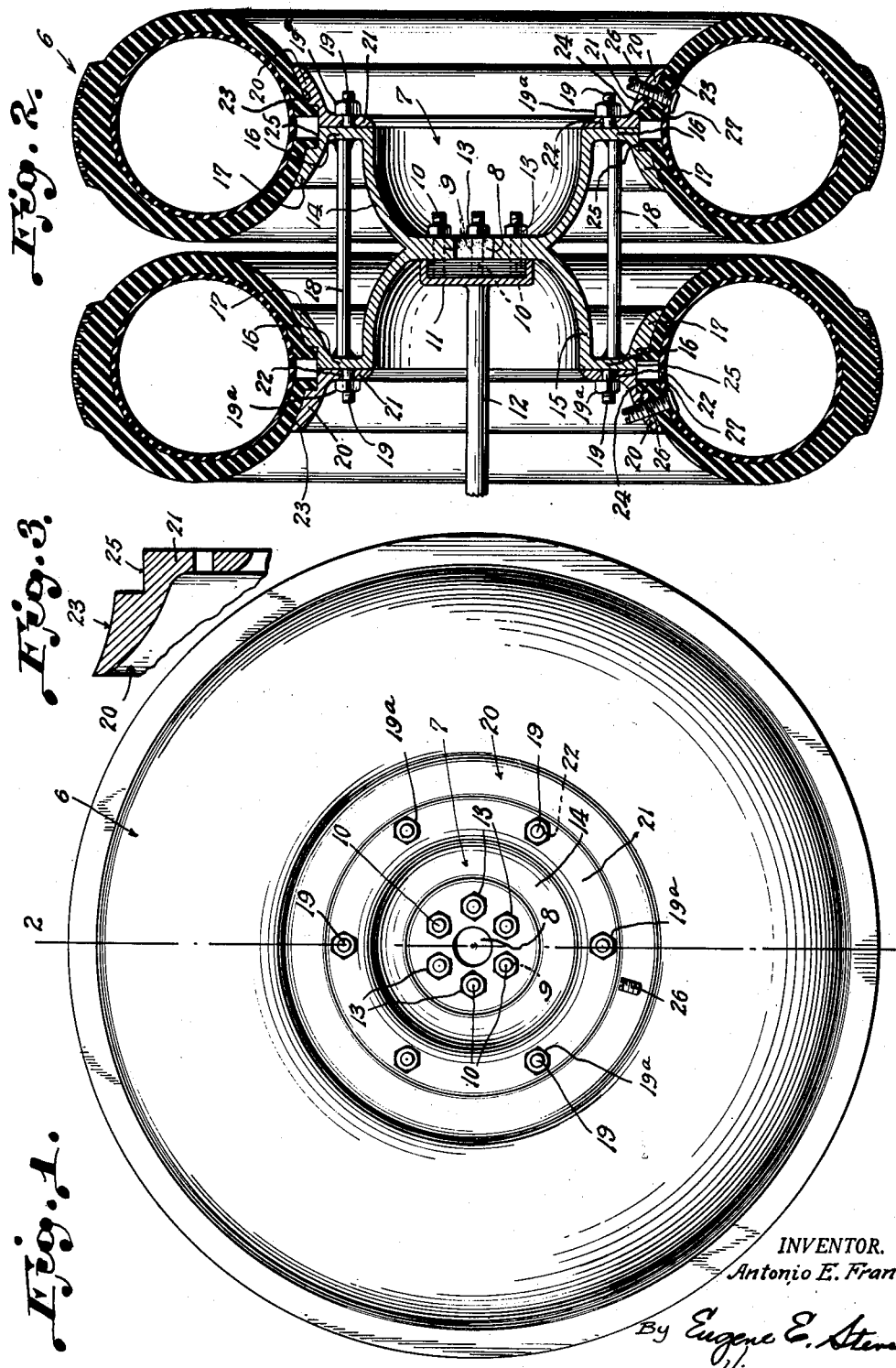
INVENTOR.
Antonio E. Frandi
By Eugene E. Stevens
His ATTORNEY.

Patented June 16, 1953

2,642,316

UNITED STATES PATENT OFFICE 2,642,316

AUTOMOBILE WHEEL MOUNTING

Antonio E. Frandi, Mexico City, Mexico

Application October 12, 1949, Serial No. 120,929

2 Claims. (Cl. 301—36)

This invention relates primarily to a dual wheel for automobile pneumatic tire mounting.

The main and important object of the invention is to provide a novel dual wheel construction fashioned from a single piece of metal and in which each tire is quickly and readily adapted to be removed by the removal of a single retaining ring.

A further object of the invention incorporates a disc wheel having a hub portion adapted to be bolted to a plate or the like made fast to an axle, the hub converging into a divided web-like portion to form parts of spaced wheel rims and a plurality of metal tubes spaced around the wheel and secured to the flanges of the respective rims.

Other objects and advantages will become apparent to those skilled in the art when considered in connection with the detailed description and accompanying drawings in which:

Fig. 1 is a view in side elevation of the wheel and tire;

Fig. 2 is a vertical sectional view taken on the line 2—2 of Fig. 1; and

Fig. 3 is a sectional view of the removable half rim section.

In the drawings, in which similar numerals are used to designate corresponding parts throughout the various views, the dual wheel is generally indicated at 6 and comprising a hub portion 7 having a central opening 8 for receiving an end of the rear axle of an automobile. The hub 7 is provided with a plurality of openings 9 spaced in a circle around the opening 8, said openings adapted to receive threaded studs 10 which are fast to a plate or cup such as 11 rigidly fixed to an axle 12. The threaded studs 10 receive nuts 13 after the studs have been passed through the holes 9 to fasten the dual wheel rigid with the axle 12.

The wheel hub is made from a single piece of metal and is divided into oppositely curved cup-form disc portions 14 and 15 which, at their outer portions, are bent at a right angle to the disc portions to form webs or flanges 16 which terminate in half tire rim portions 17. Spaced between the flanged portions 16 are a plurality of circumferentially arranged metallic rods 18 which are welded at their opposite ends to the inner sides of the spaced flanges 16 for the purpose of strengthening the wheel and the respective rims.

A plurality of circumferentially arranged threaded studs 19 are integrally attached to and project outwardly from the flange portions 16 of the respective tire rims 17. A removable tire rim half section 20 having a flange 21 which cooperates and registers flush with the flange 16 has openings 22 therein to receive the studs 19 whereby the removable rim is fastened in place with respect to the fixed rim portions 16 as by nuts 19a threaded on the studs 19. Of course it will be understood that there are two such rim sections 20, one for each side of the dual wheel. The rim section 20 has an arcuate portion 23 which fits the pneumatic tire casing.

Both the fixed rim portions 17 and 20 are recessed as at 24 and 25, said recesses receiving the usual headed portion of a pneumatic tire. The tire tube has a valve stem 26 of usual construction which projects through an opening 27 formed in the arcuate portion of the removable rim section 20.

The advantages of the invention will be readily apparent from the above description and primarily the invention provides a dual wheel made from a single piece of metal, the wheel from its center being divided in the form of a Y to provide two spaced integral half rim sections, the wheel further including two separable and removable half rim sections which cooperate with the integral rim sections to mount a pneumatic tire and tube on each rim. The removable rim can be easily and readily removed simply by removing the nuts from the studs, after which the tire can be easily removed from the rim and repaired. The invention eliminates the usual locking rings used with tires of this type, said locking rings being very hard to remove and requiring special tools, both for removing and applying the same to a tire rim for holding the tire on the rim.

Thus, the present invention eliminates the laborious job of removing and mounting pneumatic tires on their rims, and in the present invention it is only necessary to remove the removable half rim section whereupon the tire can be easily mounted and dismounted on the respective wheel sections of the dual wheel illustrated.

It is not intended that the invention be limited to the exact construction shown, but the same is capable of modification and variation within the scope of the following claims.

I claim:

1. A one piece dual disc wheel construction, comprising a vehicle wheel having a unitary one piece hub portion, said integral hub portion being divided outwardly from its middle portion into oppositely disposed, reversely curved cup-form portions, a radially extending circumferential flange extending from adjacent the outer margins of each cup-portion, each of said flanges terminating in a circumferential tire wall and bead-receiving rim portion for supporting the inner side portions of adjacent tires, a circumferential series of circumferentially spaced bars connecting said circumferential flanges between said cup portions of the hub and said tire supporting rim portions whereby to reinforce the structure, said rods being concealed by said flanges and rim portions, threaded studs extending axially away from said half rim sections in the regions of said rods, whereby to be in part sustained and reinforced by the latter, and removable half rim sections having openings through which the studs extend and adapted to embrace the outer bead portion and adjacent tire wall of a tire.

2. A one piece dual disc wheel construction in combination with an axle, comprising a vehicle wheel having a single one piece integral hub portion having stud receiving openings therein, the axle having studs extending from a plate rigid with said axle, said studs mounting the integral hub portion of the wheel, said hub portion comprising oppositely opening cup-form members, radially extending wheel defining flanges carried by said cup portions, said flanges terminating in laterally spaced half wheel rim sections, circumferentially spaced strengthening rods mounted between said half wheel rim sections and concealed thereby, and removable half wheel rim sections mounted adjacent the spaced rim sections to mount pneumatic tires on the rim formed by the fixed and removable rim sections.

ANTONIO E. FRANDI.

References Cited in the file of this patent

UNITED STATES PATENTS

| Number | Name | Date |
|---|---|---|
| 1,408,399 | Reddaway | Feb. 28, 1922 |
| 1,579,328 | LaBrie | Apr. 6, 1926 |
| 1,795,472 | Budd | Mar. 10, 1931 |
| 1,798,759 | Rogers | Mar. 31, 1931 |
| 1,852,615 | Kay | Apr. 5, 1932 |
| 1,860,665 | Eksergian | May 31, 1932 |
| 2,150,111 | Tatter | Mar. 7, 1939 |

FOREIGN PATENTS

| Number | Country | Date |
|---|---|---|
| 17,518 | Great Britain | 1904 |
| 180,931 | Great Britain | 1922 |